(12) United States Patent
Komada

(10) Patent No.: US 10,562,584 B2
(45) Date of Patent: Feb. 18, 2020

(54) BICYCLE OPERATING DEVICE

(71) Applicant: SHIMANO INC., Sakai (JP)

(72) Inventor: Yasuyuki Komada, Sakai (JP)

(73) Assignee: SHIMANO INC., Sakai (JP)

(*) Notice: Subject to any disclaimer, the term of this patent is extended or adjusted under 35 U.S.C. 154(b) by 241 days.

(21) Appl. No.: 15/361,061

(22) Filed: Nov. 24, 2016

(65) Prior Publication Data

US 2018/0141611 A1   May 24, 2018

(51) Int. Cl.
  *B62K 23/06*  (2006.01)
  *B62L 3/02*  (2006.01)
  *B62M 25/08*  (2006.01)

(52) U.S. Cl.
  CPC .............. *B62K 23/06* (2013.01); *B62L 3/023* (2013.01); *B62M 25/08* (2013.01)

(58) Field of Classification Search
  CPC ........................................................ B62L 3/023
  See application file for complete search history.

(56) References Cited

U.S. PATENT DOCUMENTS

| | | | | |
|---|---|---|---|---|
| 6,941,834 B2* | 9/2005 | Irie | ........................ | B62K 21/12 74/489 |
| 7,760,078 B2* | 7/2010 | Miki | ...................... | B62M 25/08 340/432 |
| 7,874,229 B2* | 1/2011 | Tetsuka | .................. | B62K 23/02 200/61.88 |
| 9,592,879 B2* | 3/2017 | Fukao | ..................... | B62K 23/06 |
| 9,896,150 B2* | 2/2018 | Fujiwara | .................. | B62L 3/023 |
| 2008/0087131 A1 | 4/2008 | Tetsuka | | |
| 2009/0315692 A1 | 12/2009 | Miki et al. | | |
| 2013/0032000 A1* | 2/2013 | Miki | ....................... | B62M 25/04 74/491 |
| 2015/0001018 A1* | 1/2015 | Kariyama | ............... | B62L 3/023 188/344 |
| 2015/0090112 A1* | 4/2015 | Matsueda | ............... | B62L 3/023 92/15 |
| 2015/0090550 A1* | 4/2015 | Matsueda | ............... | B62L 3/023 188/344 |

(Continued)

FOREIGN PATENT DOCUMENTS

| | | |
|---|---|---|
| CN | 101607581 | 12/2009 |
| CN | 104787209 | 7/2015 |

(Continued)

*Primary Examiner* — Thomas E Lazo
(74) *Attorney, Agent, or Firm* — Mori & Ward, LLP

(57) ABSTRACT

A bicycle operating device comprises a base member, an operating member, a piston, and an electrical switch. The base member includes a first end portion to be mounted to a bicycle handlebar, a second end portion opposite to the first end portion, and a cylinder bore. The operating member includes a proximal end portion and a distal end portion. The proximal end portion is pivotally coupled to the base member about a pivot axis. The distal end portion is farther from the proximal end portion than the pivot axis. The piston is movably provided in the cylinder bore and operatively coupled to the operating member to move in the cylinder bore in response to a pivotal movement of the operating member. The electrical switch is provided at the second end portion. The electrical switch is farther from the distal end portion of the operating member than the pivot axis.

26 Claims, 13 Drawing Sheets

(56) References Cited

U.S. PATENT DOCUMENTS

| | | |
|---|---|---|
| 2015/0203169 A1 | 7/2015 | Nishino |
| 2015/0321725 A1* | 11/2015 | Kariyama ............... B62K 23/06 74/491 |
| 2016/0152302 A1 | 6/2016 | Nishino |
| 2016/0264213 A1 | 9/2016 | Swanson et al. |
| 2017/0305493 A1* | 10/2017 | Komada ................ B62K 23/06 |

FOREIGN PATENT DOCUMENTS

| | | |
|---|---|---|
| CN | 105644704 | 6/2016 |
| TW | 201500256 | 1/2015 |
| TW | 201542416 | 11/2015 |

* cited by examiner

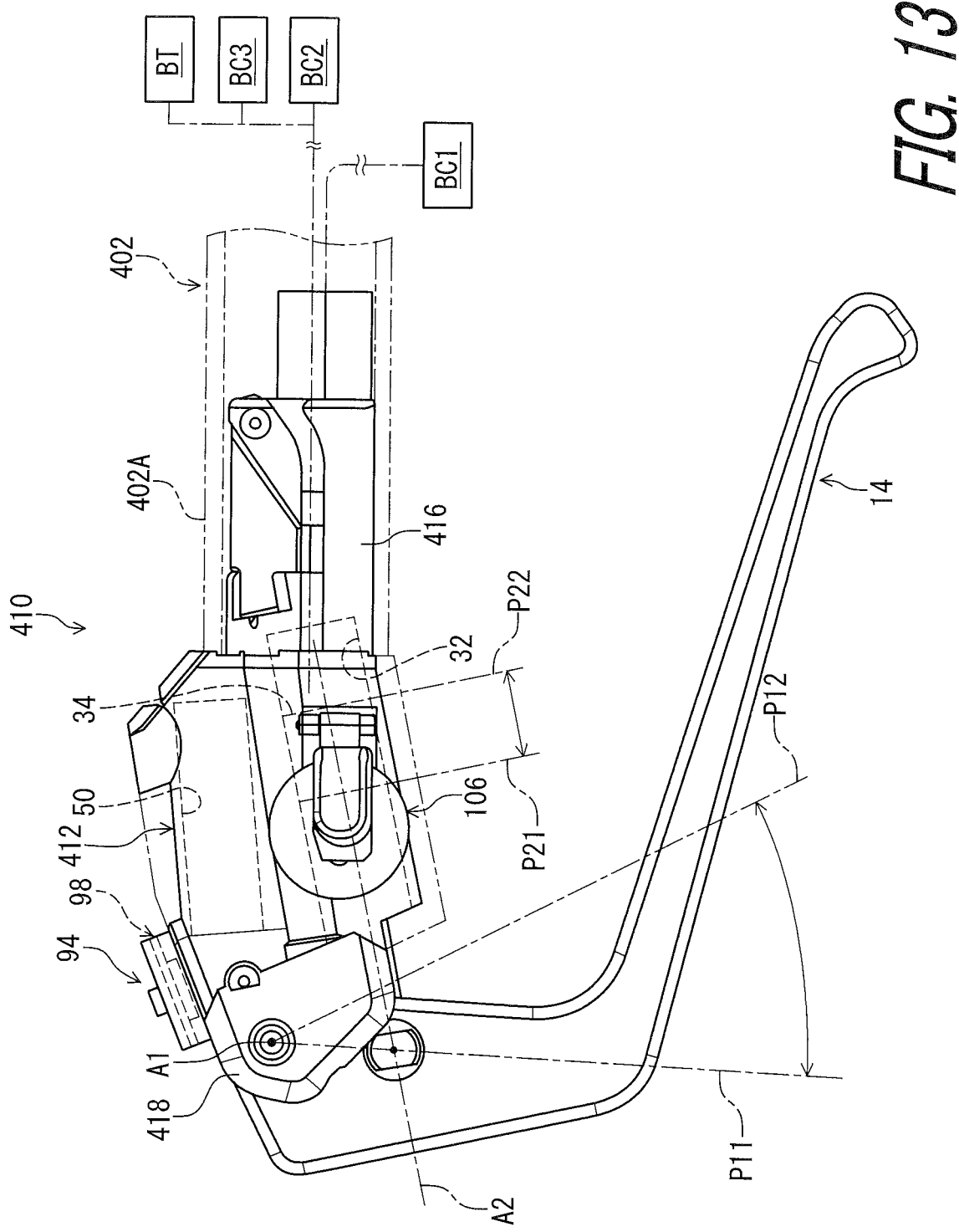

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, an operating member, a piston, and an electrical switch. The base member includes a first end portion to be mounted to a bicycle handlebar, a second end portion opposite to the first end portion, and a cylinder bore. The operating member includes a proximal end portion and a distal end portion. The proximal end portion is pivotally coupled to the base member about a pivot axis. The distal end portion is farther from the proximal end portion than the pivot axis. The piston is movably provided in the cylinder bore and operatively coupled to the operating member to move in the cylinder bore in response to a pivotal movement of the operating member. The electrical switch is provided at the second end portion. The electrical switch is farther from the distal end portion of the operating member than the pivot axis.

With the bicycle operating device according to the first aspect, it is possible to utilize the second end portion as a position at which the electrical switch is provided. Accordingly, it is possible to improve design freedom of the bicycle operating device.

In accordance with a second aspect of the present invention, a bicycle operating device comprises a base member, an operating member, a piston, and an electrical switch. The base member includes a first end portion to be mounted to a bicycle handlebar, a second end portion opposite to the first end portion, and a cylinder bore. The operating member is pivotally coupled to the base member about a pivot axis. The piston is movably provided in the cylinder bore and operatively coupled to the operating member to move in the cylinder bore in response to a pivotal movement of the operating member. The electrical switch is directly provided at the second end portion without via a movable intermediate member.

With the bicycle operating device according to the second aspect, it is possible to utilize the second end portion as an area for the electrical switch. Accordingly, it is possible to improve design freedom of the bicycle operating device.

In accordance with a third aspect of the present invention, the bicycle operating device according to the first or second aspect is configured so that the electrical switch is farther from the first end portion than the pivot axis.

With the bicycle operating device according to the third aspect, it is possible to utilize an area farther from the first end portion than the pivot axis as an area for the electrical switch. Accordingly, it is possible to further improve design freedom of the bicycle operating device.

In accordance with a fourth aspect of the present invention, the bicycle operating device according to any one of the first to third aspects is configured so that the base member includes a grip portion provided between the first end portion and the second end portion.

With the bicycle operating device according to the fourth aspect, the rider can grip the grip portion. This allows the rider to easily operate the electrical switch.

In accordance with a fifth aspect of the present invention, the bicycle operating device according to any one of the first to fourth aspects is configured so that the electrical switch is farther from the first end portion than the cylinder bore.

With the bicycle operating device according to the fifth aspect, it is possible to utilize an area farther from the first end portion than the cylinder bore as an area for the electrical switch. Accordingly, it is possible to further improve design freedom of the bicycle operating device.

In accordance with a sixth aspect of the present invention, the bicycle operating device according to any one of the first to fifth aspects is configured so that the base member includes a reservoir bore connected to the cylinder bore. The electrical switch is farther from the first end portion than the reservoir bore.

With the bicycle operating device according to the sixth aspect, it is possible to utilize an area farther from the first end portion than the reservoir bore as an area for the electrical switch. Accordingly, it is possible to further improve design freedom of the bicycle operating device.

In accordance with a seventh aspect of the present invention, the bicycle operating device according to the sixth aspect is configured so that the reservoir bore is provided above the cylinder bore in a mounting state where the base member is mounted to the bicycle handlebar.

With the bicycle operating device according to the seventh aspect, it is possible to utilize an area provided above the cylinder bore as an area for the reservoir bore. Accordingly, it is possible to further improve design freedom of the bicycle operating device.

In accordance with an eighth aspect of the present invention, the bicycle operating device according to the sixth or seventh aspect is configured so that the base member includes a bleeding port connected to the reservoir bore.

With the bicycle operating device according to the eighth aspect, it is possible to bleed a hydraulic fluid from the reservoir bore via the bleeding port. Accordingly, it is possible to improve maintenance of the bicycle operating device.

In accordance with a ninth aspect of the present invention, the bicycle operating device according to any one of the first to eighth aspects is configured so that the base member includes a pommel portion provided at the second end portion. The electrical switch is provided at the pommel portion.

With the bicycle operating device according to the ninth aspect, it is possible to utilize the pommel portion as an area for the electrical switch. Accordingly, it is possible to further improve design freedom of the bicycle operating device.

In accordance with a tenth aspect of the present invention, the bicycle operating device according to the ninth aspect is configured so that the electrical switch includes a user operating portion forwardly and upwardly facing in a mounting state where the base member is mounted to the bicycle handlebar.

With the bicycle operating device according to the tenth aspect, it is possible to improve operability of the electrical switch.

In accordance with an eleventh aspect of the present invention, the bicycle operating device according to the ninth or tenth aspect is configured so that the first end portion defines a first end surface configured to be in contact with the bicycle handlebar. The pommel portion defines a second end surface farthest from the first end surface. The electrical switch includes a user operating portion arranged in the second end surface.

With the bicycle operating device according to the eleventh aspect, it is possible to improve design freedom of the bicycle operating device with improving operability of the electrical switch.

In accordance with a twelfth aspect of the present invention, the bicycle operating device according to any one of the first to eleventh aspects further comprises a controller electrically connected to the electrical switch to generate a control signal based on an operation of the electrical switch.

With the bicycle operating device according to the twelfth aspect, it is possible to operate an electrical device using the electrical switch.

In accordance with a thirteenth aspect of the present invention, the bicycle operating device according to the twelfth aspect is configured so that the electrical switch is provided on the controller.

With the bicycle operating device according to the thirteenth aspect, it is possible to unitize the electrical switch and the controller as a single unit.

In accordance with a fourteenth aspect of the present invention, the bicycle operating device according to the twelfth or thirteenth aspect is configured so that the electrical switch is farther from the first end portion than the controller.

With the bicycle operating device according to the fourteenth aspect, it is possible to utilize an area farther from the first end portion than the controller as an area for the electrical switch. This allows the rider to easily operate the electrical switch even if the controller is provided in the bicycle operating device.

In accordance with a fifteenth aspect of the present invention, the bicycle operating device according to any one of the twelfth to fourteenth aspect further comprises an additional electrical switch provided at one of the base member and the operating member. The additional electrical switch is electrically connected to the controller.

With the bicycle operating device according to the fifteenth aspect, it is possible to operate an additional device using the additional electrical switch.

In accordance with a sixteenth aspect of the present invention, the bicycle operating device according to the fifteenth aspect is configured so that the additional electrical switch is provided at the operating member.

With the bicycle operating device according to the sixteenth aspect, it is possible to utilize the operating member as an area for the additional electrical switch. Accordingly, it is possible to further improve design freedom of the bicycle operating device.

In accordance with a seventeenth aspect of the present invention, the bicycle operating device according to any one of the twelfth to sixteenth aspect further comprises a cable connector provided at one of the base member and the operating member. The cable connector is electrically connected to the controller.

With the bicycle operating device according to the seventeenth aspect, it is possible to electrically connect at least one electrical device to the controller via the cable connector.

In accordance with an eighteenth aspect of the present invention, the bicycle operating device according to the seventeenth aspect is configured so that the cable connector is provided at the base member.

With the bicycle operating device according to the eighteenth aspect, it is possible to utilize the base member as an area for the cable connector.

In accordance with a nineteenth aspect of the present invention, the bicycle operating device according to any one of the twelfth to eighteenth aspects further comprises a wireless communicator provided at one of the base member and the operating member. The wireless communicator is electrically connected to the controller.

With the bicycle operating device according to the nineteenth aspect, it is possible to wirelessly operate the electrical device using the electrical switch or other electrical switches.

In accordance with a twentieth aspect of the present invention, the bicycle operating device according to any one of the first to nineteenth aspects is configured so that the cylinder bore has a cylinder center axis. The electrical switch includes a user operating portion movable relative to the base member along an operating axis defined not to coincide with the cylinder center axis.

With the bicycle operating device according to the twentieth aspect, it is possible to easily operate the electrical switch using the user operating portion.

In accordance with a twenty-first aspect of the present invention, the bicycle operating device according to the twentieth aspect is configured so that the operating axis is inclined relative to the cylinder center axis as viewed along the pivot axis.

With the bicycle operating device according to the twenty-first aspect, it is possible to improve design freedom of the bicycle operating device by changing an inclination angle of the operating axis relative to the cylinder center axis.

In accordance with a twenty-second aspect of the present invention, the bicycle operating device according to the twentieth aspect is configured so that an inclination angle defined between the operating axis and the cylinder center axis is equal to or smaller than 45 degrees as viewed along the pivot axis.

With the bicycle operating device according to the twenty-second aspect, it is possible to further improve design freedom of the bicycle operating device with keeping operability of the electrical switch.

In accordance with a twenty-third aspect of the present invention, the bicycle operating device according to any one of the twentieth to twenty-second aspects is configured so that the operating axis is offset from the cylinder center axis as viewed in a direction perpendicular to the pivot axis.

With the bicycle operating device according to the twenty-third aspect, it is possible to adapt a position of the electrical switch to one of a right hand and a left hand. This further improves operability of the electrical switch.

In accordance with a twenty-fourth aspect of the present invention, the bicycle operating device according to any one of the first to twenty-third aspects is configured so that the operating member is operatively coupled to the piston to pull the piston from an initial position to an actuated position in response to a pivotal movement of the operating member.

With the bicycle operating device according to the twenty-fourth aspect, it is possible to apply the electrical switch to the bicycle operating device including a pull-type hydraulic unit.

In accordance with a twenty-fifth aspect of the present invention, the bicycle operating device according to any one of the first to twenty-third aspects is configured so that the operating member is operatively coupled to the piston to push the piston from an initial position to an actuated position in response to a pivotal movement of the operating member.

With the bicycle operating device according to the twenty-fifth aspect, it is possible to apply the electrical switch to the bicycle operating device including a push-type hydraulic unit.

In accordance with a twenty-sixth aspect of the present invention, the bicycle operating device according to any one of the first to twenty-fifth aspects is configured so that the pivot axis is farther from the first end portion than the cylinder bore.

With the bicycle operating device according to the twenty-sixth aspect, it is possible to make the second end portion compact and thus to realize an attractive appearance.

In accordance with a twenty-seventh aspect of the present invention, the bicycle operating device according to any one of the first to twenty-sixth aspects is configured so that the cylinder bore is arranged between the pivot axis and the first end portion.

With the bicycle operating device according to the twenty-seventh aspect, it is possible to make the second end portion compact and thus to realize an attractive appearance.

In accordance with a twenty-eighth aspect of the present invention, the bicycle operating device according to any one of the first to twenty-seventh aspects further comprises a grip cover attached to the base member to at least partly cover the base member. The electrical switch is covered by the grip cover to be operated via the grip cover.

With the bicycle operating device according to the twenty-eighth aspect, it is possible to protect the electrical switch from getting dirty.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 13 is a side elevational view of a bicycle operating device in accordance with a fourth embodiment.

DESCRIPTION OF THE EMBODIMENTS

Figure 1:
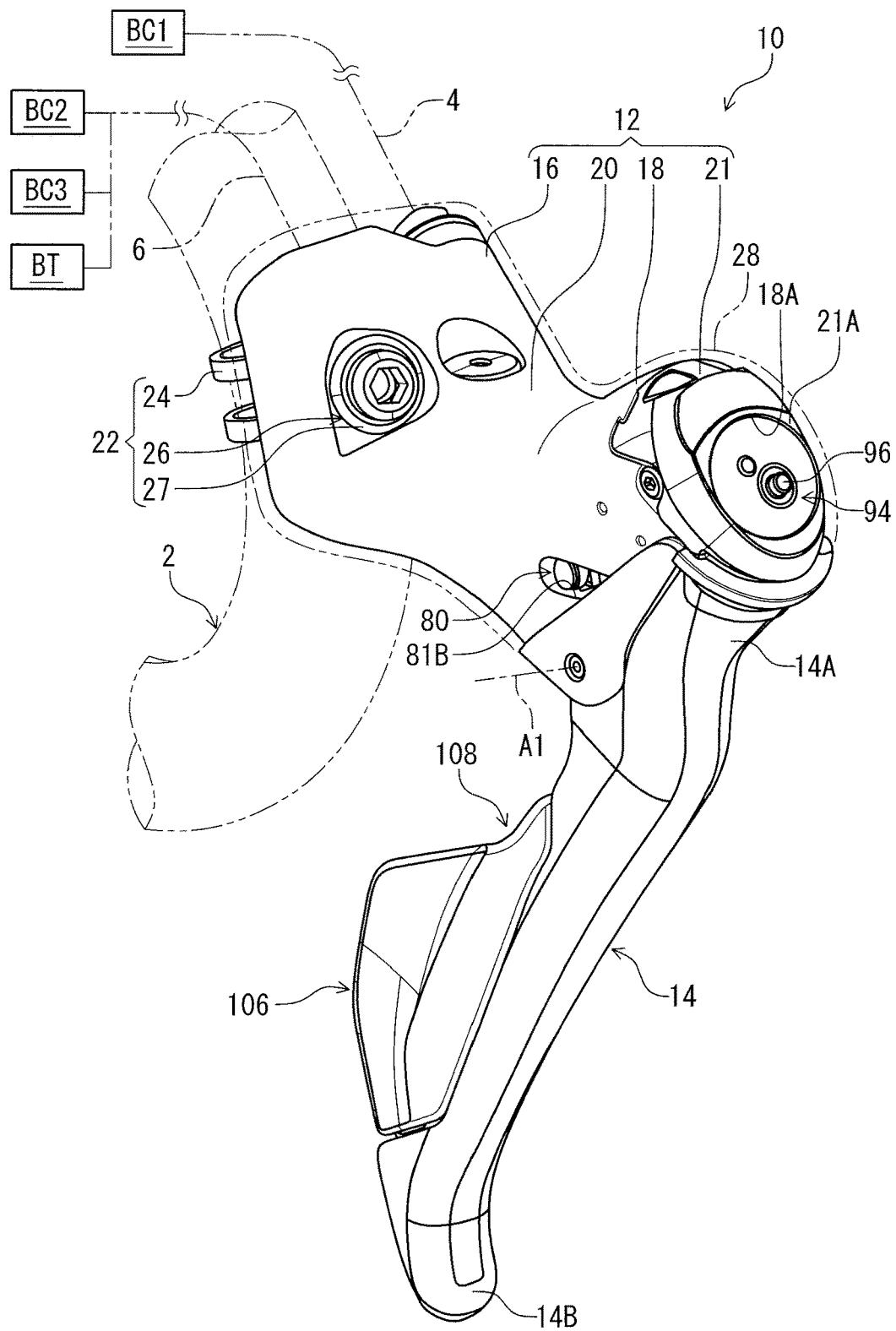
FIG. 1 is a perspective view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle handlebar 2. In this embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar.

The bicycle operating device 10 is operatively coupled to at least one device to operate the at least one device. In this embodiment, the bicycle operating device 10 is operatively coupled to a hydraulic bicycle component BC1 such as a hydraulic brake device. The bicycle operating device 10 is operatively coupled to the hydraulic bicycle component BC1 via a hydraulic hose 4.

Figure 2:
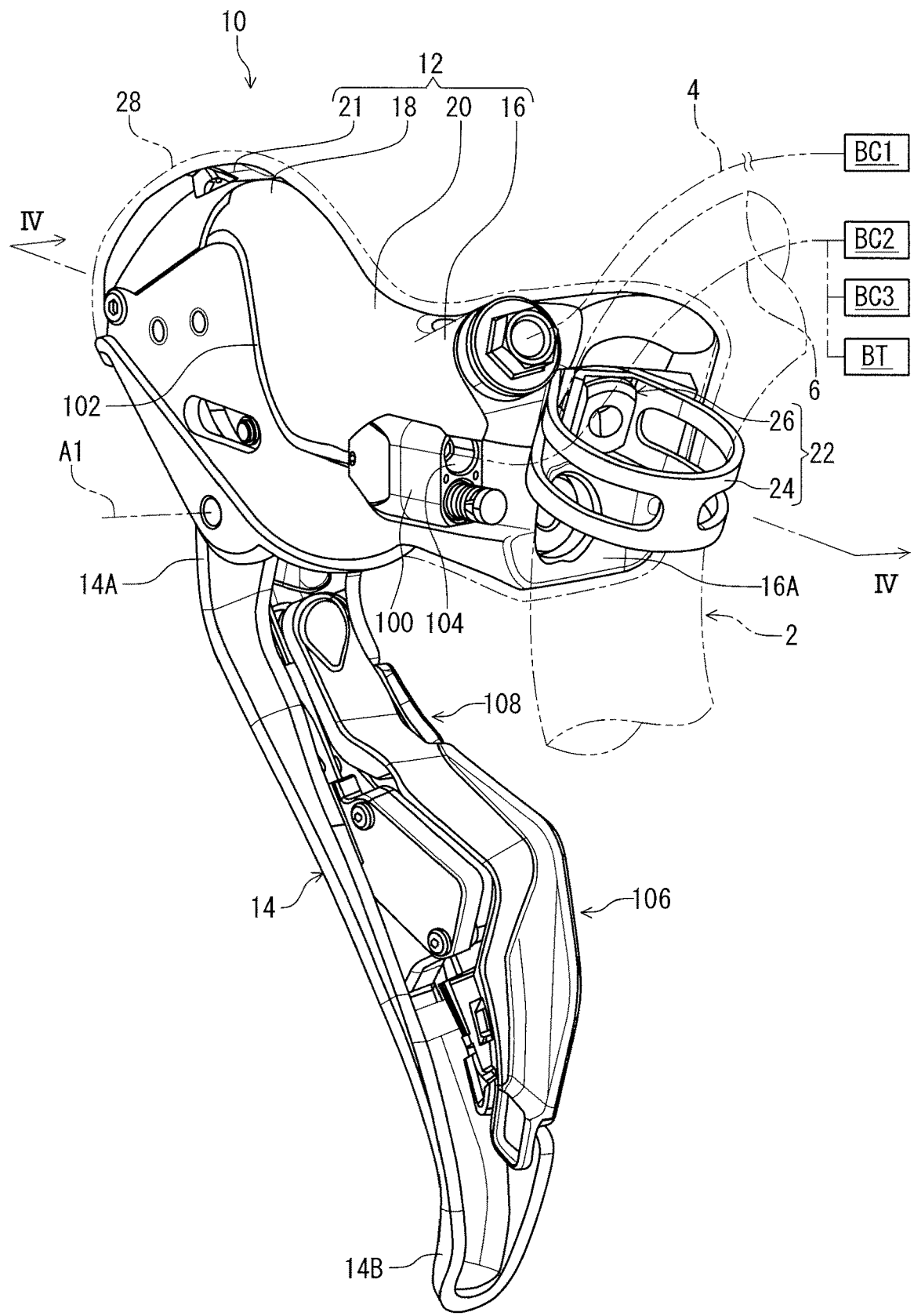
FIG. 2 is another perspective view of the bicycle operating device illustrated in FIG. 1.

As seen in FIG. 2, the bicycle operating device 10 is operatively coupled to an electrical device BC2 and an additional device BC3. Examples of the electrical device BC2 include a bicycle seatpost, a bicycle suspension, a bicycle shifting device, a cycle computer, and a smart phone. Examples of the additional device BC3 include an electrical component and a mechanical component. Examples of the electrical component include a bicycle seatpost, a bicycle suspension, a bicycle shifting device, a cycle computer, and a smart phone. Examples of the mechanical component include a bicycle seatpost, a bicycle suspension, and a bicycle shifting device. In this embodiment, the electrical device BC2 includes the bicycle seatpost, and the additional device BC3 includes the bicycle shifting device. The bicycle operating device 10 is operatively coupled to the electrical device BC2 and the additional device BC3 via an electrical control cable 6. The bicycle operating device 10 is operatively coupled to the electrical device BC2 and the additional device BC3 via separate electrical control cables extending from the bicycle operating device 10, respectively. The bicycle operating device 10 can be operatively coupled to the additional device BC3 via a mechanical control cable in a case where the additional device BC3 includes a mechanical shifting device. Furthermore, the bicycle operating device 10 can be operatively coupled to at least one of the electrical device BC2 and the additional device BC3 via wireless communication. The additional device BC3 can be omitted if needed and/or desired.

In this embodiment, the bicycle operating device 10 is a right-hand side operating/control device configured to be operated by the rider's right hand to actuate the hydraulic bicycle component BC1. However, the structures of the bicycle operating device 10 can be applied to a left-hand side operating device.

In the present application, the following directional terms "front", "rear", "forward", "rearward", "left", "right", "transverse", "upward" and "downward" as well as any other similar directional terms refer to those directions which are determined on the basis of the user (e.g., the rider) who sits on a saddle (not shown) of a bicycle with facing the bicycle handlebar 2. Accordingly, these terms, as utilized to describe the bicycle operating device 10, should be interpreted relative to the bicycle equipped with the bicycle operating device 10 as used in an upright riding position on a horizontal surface.

As seen in FIGS. 1 and 2, the bicycle operating device 10 comprises a base member 12 and an operating member 14. The base member 12 includes a first end portion 16 to be mounted to the bicycle handlebar 2. The base member 12 includes a second end portion 18 opposite to the first end portion 16. In this embodiment, the base member 12 includes a grip portion 20 and a pommel portion 21. The grip portion 20 is provided between the first end portion 16 and the second end portion 18. The pommel portion 21 is provided at the second end portion 18. The pommel portion 21 forwardly and upwardly extends from the grip portion 20 in a mounting state where the base member 12 is mounted to the bicycle handlebar 2. At least one of the grip portion 20 and the pommel portion 21 can be omitted from the base member 12.

The first end portion 16 defines a first end surface 16A configured to be in contact with the bicycle handlebar 2. The pommel portion 21 defines a second end surface 21A (FIG. 3) farthest from the first end surface 16A. In this embodiment, the first end surface 16A has a curved surface, and the second end surface 21A has a flat surface. However, the shapes of the first end portion 16 and the second end portion 18 are not limited to this embodiment.

The bicycle operating device 10 further comprises a mounting structure 22 to mount the first end portion 16 to the bicycle handlebar 2. The mounting structure 22 is a stationary member when mounted to the bicycle handlebar 2. The mounting structure 22 preferably includes a band clamp 24 and a tightening member 26. The tightening member 26 is coupled to the band clamp 24 and includes a mounting bolt 27 (FIG. 1) so as to clamp the bicycle handlebar 2 between the band clamp 24 and the first end portion 16. The mounting structure 22 can include other structures which are similar to the band clamp 24 and which are used in a road shifter for mounting to a drop-down handlebar.

The bicycle operating device 10 further comprises a grip cover 28 attached to the base member 12 to at least partly cover the base member 12. The grip cover 28 is made of a non-metallic material such as rubber. A rider sometimes grips the base member 12 (e.g., the grip portion 20) and leans on the base member 12 (e.g., the grip portion 20) during riding. The grip cover 28 can be omitted from the bicycle operating device 10.

Figure 3:
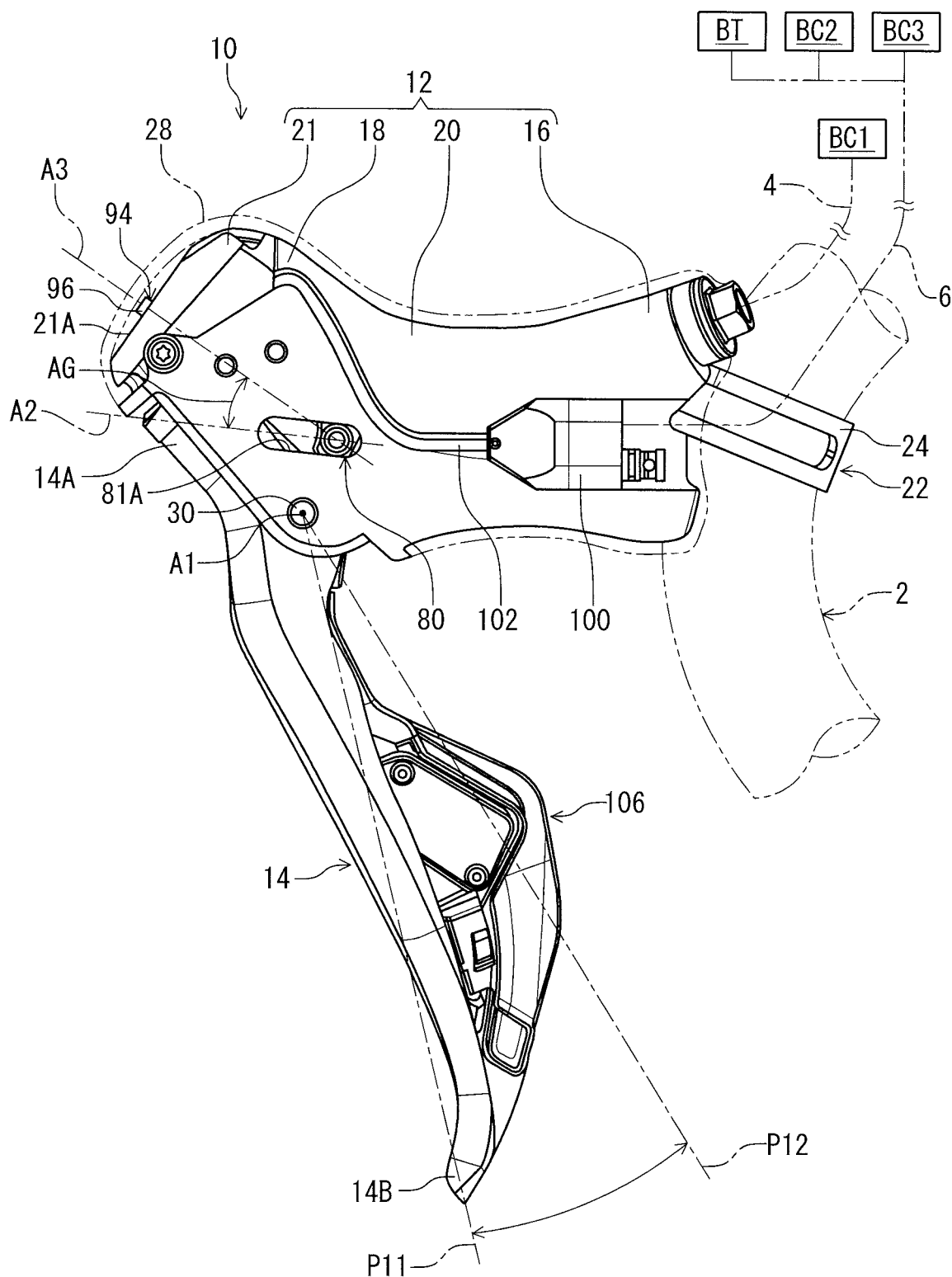
FIG. 3 is a side elevational view of the bicycle operating device illustrated in FIG. 1.

As seen in FIG. 3, the operating member 14 is provided as a lever extending in a longitudinal direction. The operating member 14 includes a proximal end portion 14A and a distal end portion 14B. The proximal end portion 14A is pivotally coupled to the base member 12 about a pivot axis A1. The distal end portion 14B is farther from the proximal end portion 14A than the pivot axis A1 in the longitudinal direction of the operating member 14. The distal end portion 14B is farthest from the proximal end portion 14A in the operating member 14 and constitutes a free end of the operating member 14.

The operating member 14 is pivotable relative to the base member 12 between a rest position P11 and an operated position P12 about the pivot axis A1. The bicycle operating device 10 includes a pivot shaft 30 defining the pivot axis A1. The pivot shaft 30 pivotally couples the operating member 14 to the base member 12. In this embodiment, the rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a bicycle component such as the hydraulic bicycle component BC1.

Figure 4:
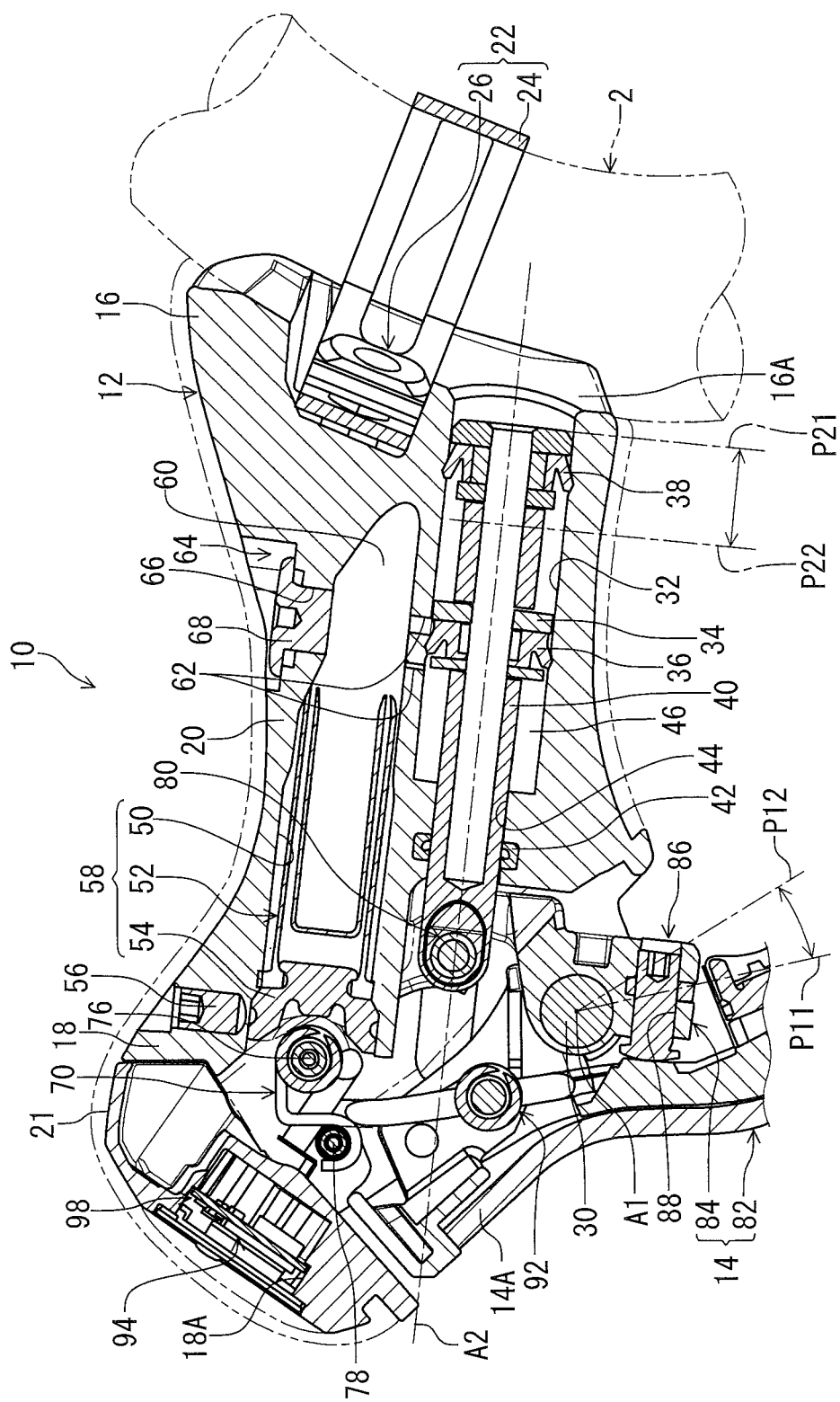
FIG. 4 is a cross-sectional view of the bicycle operating device taken along line IV-IV of FIG. 2.

As seen in FIG. 4, the base member 12 includes a cylinder bore 32. The cylinder bore 32 has a cylinder center axis A2. The cylinder bore 32 extends along the cylinder center axis A2. The cylinder bore 32 is connected to the first end surface 16A of the first end portion 16. The cylinder bore 32 is arranged between the pivot axis A1 and the first end portion 16. The pivot axis A1 is farther from the first end portion 16 than the cylinder bore 32.

The bicycle operating device 10 comprises a piston 34 movably provided in the cylinder bore 32. The piston 34 is movable relative to the cylinder bore 32 along the cylinder center axis A2. The piston 34 is operatively coupled to the operating member 14 to move in the cylinder bore 32 in response to a pivotal movement of the operating member 14. The operating member 14 is operatively coupled to the piston 34 to pull the piston 34 from an initial position P21 to an actuated position P22 in response to the pivotal movement of the operating member 14. The initial position P21 corresponds to the rest position P11 of the operating member 14. The actuated position P22 corresponds to the operated position P12 of the operating member 14.

The bicycle operating device 10 comprises a first seal ring 36 and a second seal ring 38. The first seal ring 36 and the second seal ring 38 are attached to the piston 34. The first seal ring 36 is spaced apart from the second seal ring 38 along the cylinder center axis A2.

The bicycle operating device 10 comprises a piston rod 40 and a third seal ring 42. The piston rod 40 is coupled to the piston 34 and extends from the piston 34 toward an opposite side of the first end portion 16 relative to the piston 34. While the piston rod 40 is integrally provided with the piston 34 as a one-piece unitary member in this embodiment, the piston rod 40 can be a separate member from the piston 34. The base member 12 includes a through-hole 44 coupled to the cylinder bore 32. The piston rod 40 is movably provided in the through-hole 44. The third seal ring 42 is provided in the through-hole 44. The cylinder bore 32, the piston 34, the first seal ring 36, and the third seal ring 42 define a hydraulic chamber 46. The hydraulic chamber 46 is filled with a hydraulic fluid such as mineral oil.

Figure 5:
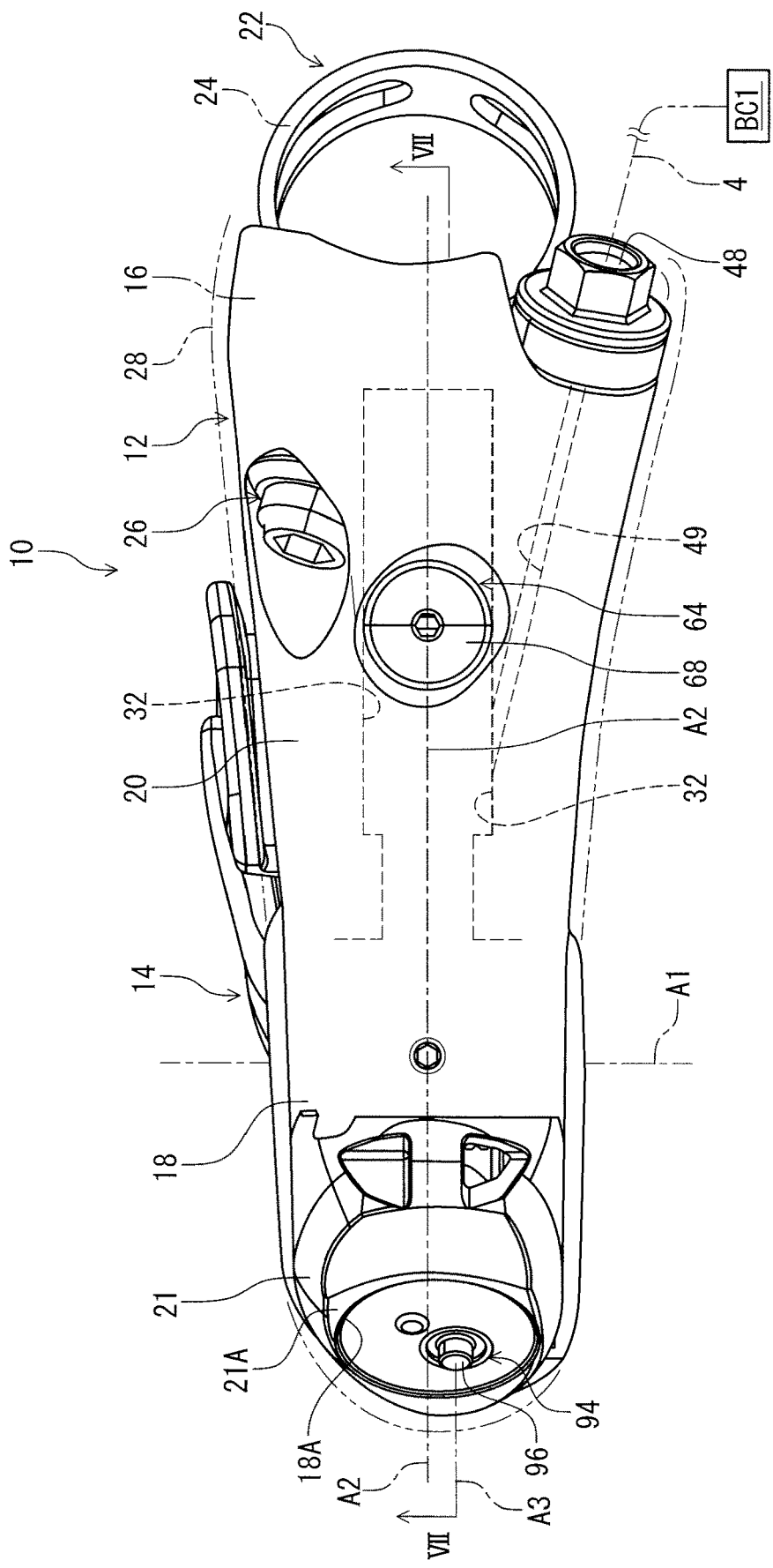
FIG. 5 is a plan view of the bicycle operating device illustrated in FIG. 1.

As seen in FIG. 5, the bicycle operating device 10 includes an outlet port 48 connected to the cylinder bore 32 to supply a hydraulic pressure to the hydraulic bicycle component BC1. The base member 12 includes an outlet passageway 49 connecting the hydraulic chamber 46 to the outlet port 48. The hydraulic chamber 46 is connected to the hydraulic hose 4 via the outlet passageway 49 and the outlet port 48.

As seen in FIG. 4, the base member 12 includes a reservoir bore 50 connected to the cylinder bore 32. The reservoir bore 50 extends along the cylinder center axis A2. The bicycle operating device 10 comprises a diaphragm 52 and a lid 54. The diaphragm 52 is provided in the reservoir bore 50 to be elastically deformable in the reservoir bore 50. The lid 54 is secured to the base member 12 to cover an end opening of the reservoir bore 50. In this embodiment, the lid 54 is secured to the base member 12 with a securing member 56. The reservoir bore 50, the diaphragm 52, and the lid 54 constitute a hydraulic reservoir 58. The reservoir bore 50 and the diaphragm 52 define a reservoir chamber 60. The reservoir chamber 60 is filled with the hydraulic fluid such as mineral oil.

In this embodiment, the reservoir bore 50 is provided above the cylinder bore 32 in the mounting state where the base member 12 is mounted to the bicycle handlebar 2. The reservoir bore 50 is farther from the distal end portion 14B than the cylinder bore 32. However, the position of the reservoir bore 50 is not limited to this embodiment. The reservoir bore 50 can be omitted from the bicycle operating device 10.

The base member 12 includes communication holes 62. The communication holes 62 connect the reservoir chamber 60 with the hydraulic chamber 46 in a state where the piston 34 is positioned at the initial position P21. The first seal ring 36 interrupts communication between the hydraulic chamber 46 and the reservoir chamber 60 via the communication holes 62 when the piston 34 is moved from the initial position P21 toward the actuated position P22. The hydraulic reservoir 58 can be omitted from the bicycle operating device 10 or can be provided at the hydraulic bicycle component BC1.

As seen in FIG. 4, the base member 12 includes a bleeding port 64 connected to the reservoir bore 50. In this embodiment, the bleeding port 64 includes a threaded hole 66. The threaded hole 66 connects the reservoir bore 50 to an outside surface of the base member 12. The bicycle operating device 10 includes a bleeding plug 68. The bleeding plug 68 is threadedly engaged with the threaded hole 66. The bleeding port 64 can be omitted from the bicycle operating device 10.

The bicycle operating device 10 further comprises a piston biasing member 70 to bias the piston 34 from the actuated position P22 toward the initial position P21. In this embodiment, the piston biasing member 70 is provided outside the cylinder bore 32. The piston biasing member 70 is provided in the second end portion 18. However, the piston biasing member 70 can be provided at positions other than the second end portion 18. The piston biasing member 70 can be provided in the cylinder bore 32.

Figure 6:
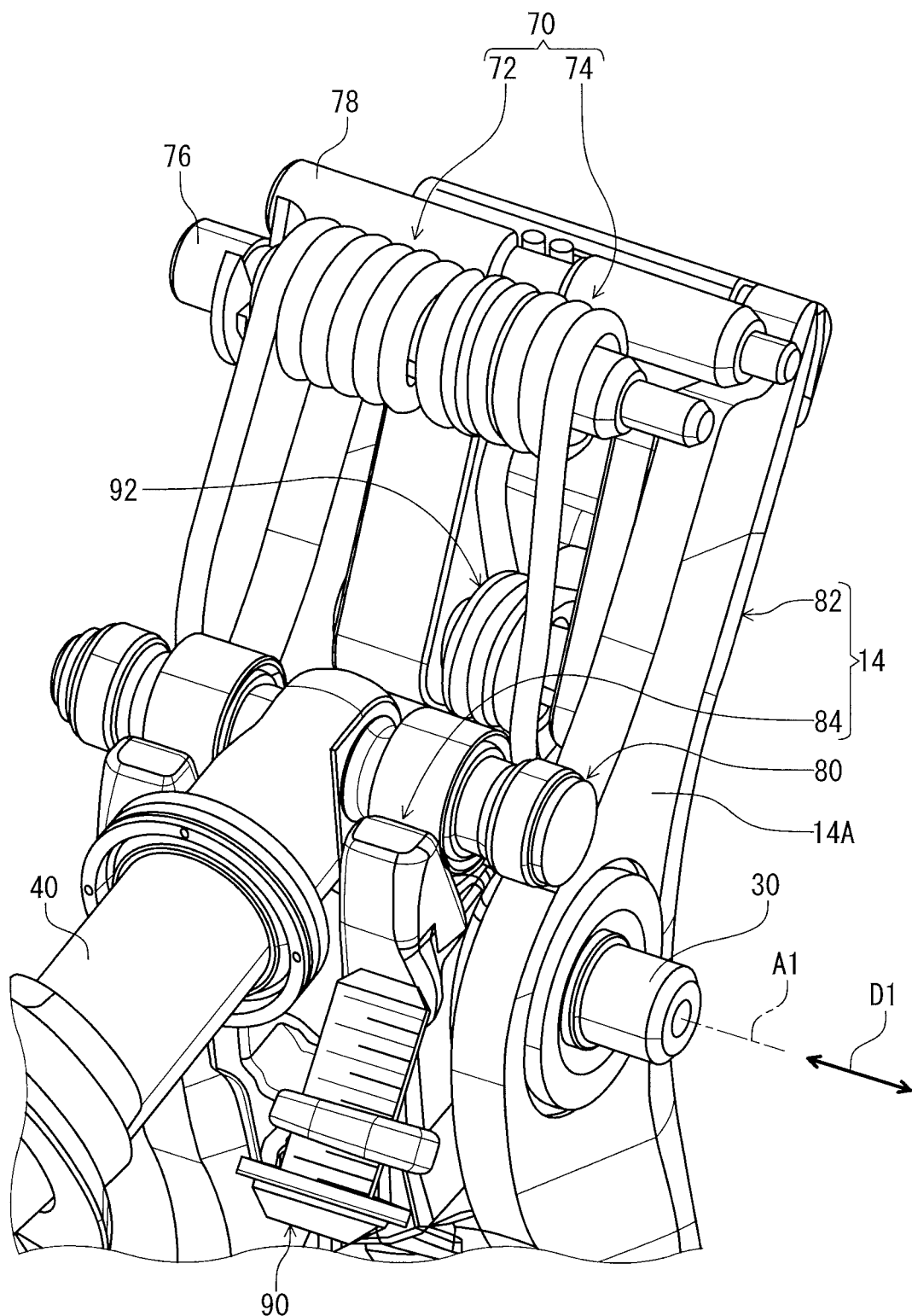
FIG. 6 is a perspective view of the bicycle operating device illustrated in FIG. 1 with a base member omitted.

As seen in FIG. 6, the piston biasing member 70 includes a first biasing element 72 and a second biasing element 74. While the first and second biasing elements 72 and 74 are torsion coil springs in this embodiment, the first and second biasing elements 72 and 74 can be other biasing elements such as a compression coil spring.

The bicycle operating device 10 includes a first support shaft 76 and a second support shaft 78. The first support shaft 76 is secured to the base member 12 (FIG. 4) and extends in an axial direction D1 parallel to the pivot axis A1 of the operating member 14. The second support shaft 78 is secured to the base member 12 (FIG. 4) and extends in the axial direction D1. The first and second biasing elements 72 and 74 are mounted on the first support shaft 76. The bicycle operating device 10 includes a coupling shaft 80 coupled to an end of the piston rod 40. The coupling shaft 80 extends in the axial direction D1. As seen in FIGS. 1 and 3, the base member 12 includes a first guide groove 81A and a second guide groove 81B. The coupling shaft 80 is movably provided in the first guide groove 81A and the second guide groove 81B. Each of the first and second biasing elements 72 and 74 is engaged with the first support shaft 76 and the coupling shaft 80 to bias the piston 34 toward the initial position P21 (FIG. 4).

As seen in FIGS. 4 and 6, the operating member 14 includes an operating lever or main body 82 and an intermediate body 84. The proximal end portion 14A and the distal end portion 14B are provided on the operating lever 82. The intermediate body 84 is a separate member from the operating lever 82. The operating lever 82 and the intermediate body 84 are pivotally coupled to the base member 12 about the pivot axis A1 via the pivot shaft 30. The operating lever 82 and the intermediate body 84 are rotatable relative to each other about the pivot axis A1. In this embodiment, the operating lever 82 includes the proximal end portion 14A and the distal end portion 14B. Namely, the rest position P11 and the operated position P12 are defined by the operating lever 82. The intermediate body 84 is engaged with the coupling shaft 80 to transmit an operation force applied to the operating lever 82.

As seen in FIG. 4, the bicycle operating device 10 comprises a first adjusting member 86 to change the rest position P11 of the operating member 14 relative to the base member 12. In this embodiment, the first adjusting member 86 is mounted to the operating member 14. The first adjusting member 86 is attached to the intermediate body 84 of the operating member 14. The intermediate body 84 includes a first threaded hole 88. The first adjusting member 86 includes an adjustment screw and is threadedly engaged with the first threaded hole 88. An end of the first adjusting member 86 is in contact with the operating lever 82. Rotation of the first adjusting member 86 relative to the intermediate body 84 changes a position of the operating lever 82 relative to the intermediate body 84. This changes the rest position P11 of the operating member 14 without changing the initial position P21 of the piston 34.

As seen in FIG. 6, the bicycle operating device 10 comprises a second adjusting member 90 to change the initial position P21 (FIG. 4) of the piston 34 relative to the base member 12. In this embodiment, the second adjusting member 90 includes an adjusting screw mounted to the base member 12 (FIG. 4). The second adjusting member 90 is threadedly engaged with a first threaded hole (not shown) of the base member 12 (FIG. 4). An end of the second adjusting member 90 is in contact with the intermediate body 84. Rotation of the second adjusting member 90 changes a position of the intermediate body 84 relative to the base member 12. This changes the initial position P21 of the piston 34 and further changes the rest position P11 of the operating member 14.

As seen in FIG. 6, the bicycle operating device 10 comprises a lever biasing member 92 to bias the operating lever 82 relative to the intermediate body 84 to keep contact between the first adjusting member 86 (FIG. 4) and the operating lever 82. The lever biasing member 92 is attached to the operating member 14. While the lever biasing member 92 is a torsion coil spring in this embodiment, the lever biasing member 92 can be other biasing elements such as a compression coil spring.

Figure 7:
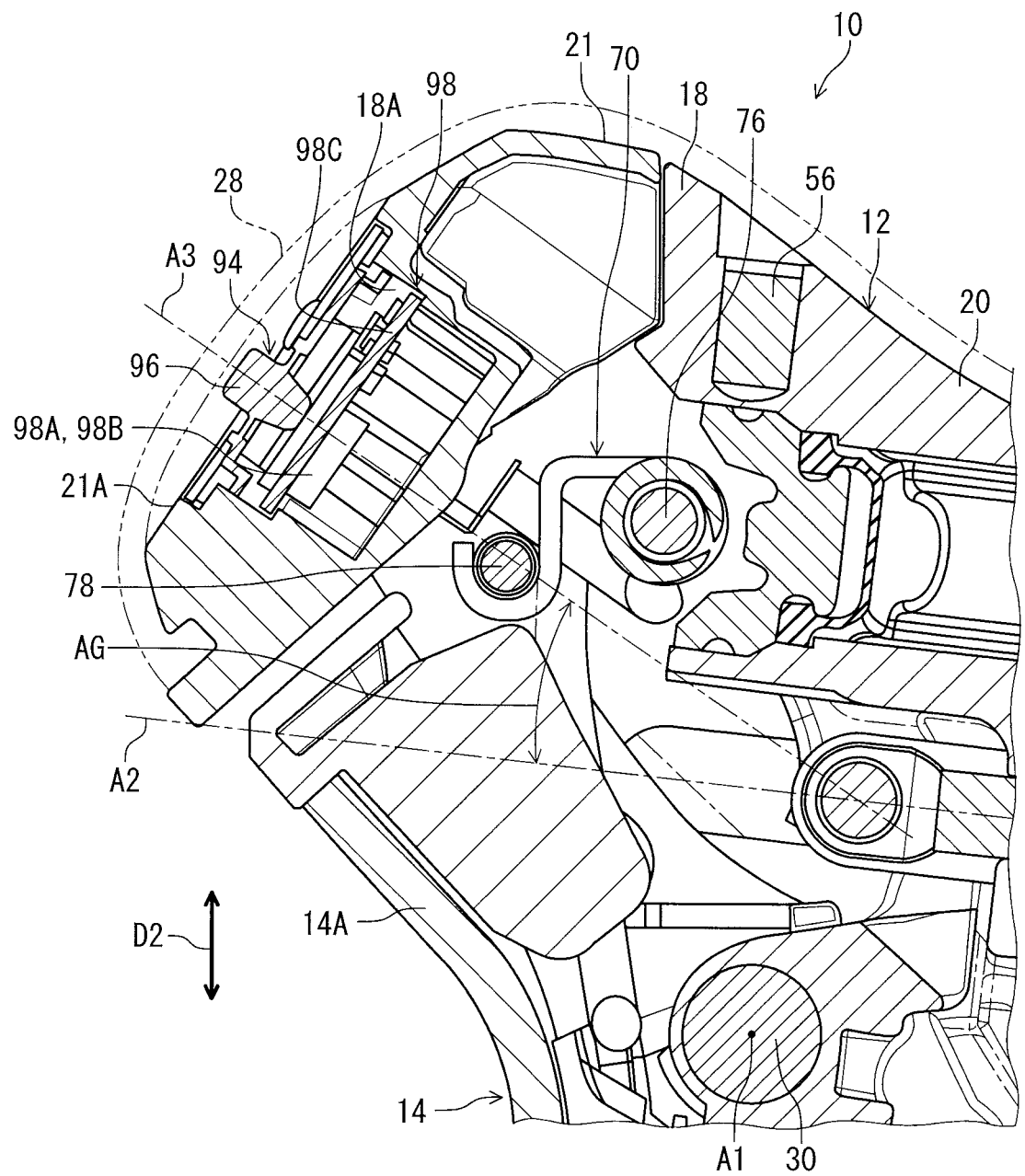
FIG. 7 is a partial cross-sectional view of the bicycle operating device taken along line VII-VII of FIG. 5.

As seen in FIG. 7, the bicycle operating device 10 comprises an electrical switch 94 provided at the second end portion 18. In this embodiment, the electrical switch 94 is provided at the pommel portion 21. The electrical switch 94 is attached to the second end portion 18 (e.g., the pommel portion 21). However, the position of the electrical switch 94 is not limited to this embodiment. The electrical switch 94 is directly provided at the second end portion 18 without via a movable intermediate member. The electrical switch 94 includes a user operating portion 96. The user operating portion 96 forwardly and upwardly faces in the mounting state where the base member 12 is mounted to the bicycle handlebar 2 (FIG. 4). The user operating portion 96 is arranged in the second end surface 21A. The user operating portion 96 protrudes from the second end surface 21A. In this embodiment, the electrical switch 94 is provided in a recess 18A of the second end portion 18 of the base member 12. The electrical switch 94 is covered by the grip cover 28 to be operated via the grip cover 28. The user operating portion 96 is covered by the grip cover 28 to be pushed via the grip cover 28. However, the user operating portion 96 can be exposed from the grip cover 28. The user operating portion 96 can be omitted from the electrical switch 94.

As seen in FIG. 7, the user operating portion 96 is movable relative to the base member 12 along an operating axis A3 defined not to coincide with the cylinder center axis A2. In this embodiment, the operating axis A3 is non-parallel to the cylinder center axis A2. However, the operating axis A3 can be parallel to the cylinder center axis A2. The operating axis A3 can be defined to coincide with the cylinder center axis A2.

The operating axis A3 is inclined relative to the cylinder center axis A2 as viewed along the pivot axis A1. An inclination angle AG defined between the operating axis A3 and the cylinder center axis A2 is equal to or smaller than 45 degrees as viewed along the pivot axis A1. As seen in FIG. 5, the operating axis A3 is offset from the cylinder center axis A2 as viewed in a direction D2 (FIG. 7) perpendicular to the pivot axis A1. The operating axis A3 is parallel to the cylinder center axis A2 as viewed in the direction D2 (FIG. 7) perpendicular to the pivot axis A1. However, the operating axis A3 can be non-parallel to the cylinder center axis A2 as viewed in the direction D2 (FIG. 7) perpendicular to the pivot axis A1.

As seen in FIG. 3, the electrical switch 94 is farther from the distal end portion 14B of the operating member 14 than the pivot axis A1. The electrical switch 94 is farther from the first end portion 16 than the pivot axis A1. The electrical switch 94 is farther from the first end portion 16 than the cylinder bore 32. The electrical switch 94 is farther from the first end portion 16 than the reservoir bore 50. However, the position of the electrical switch 94 is not limited to this embodiment.

Figure 8:
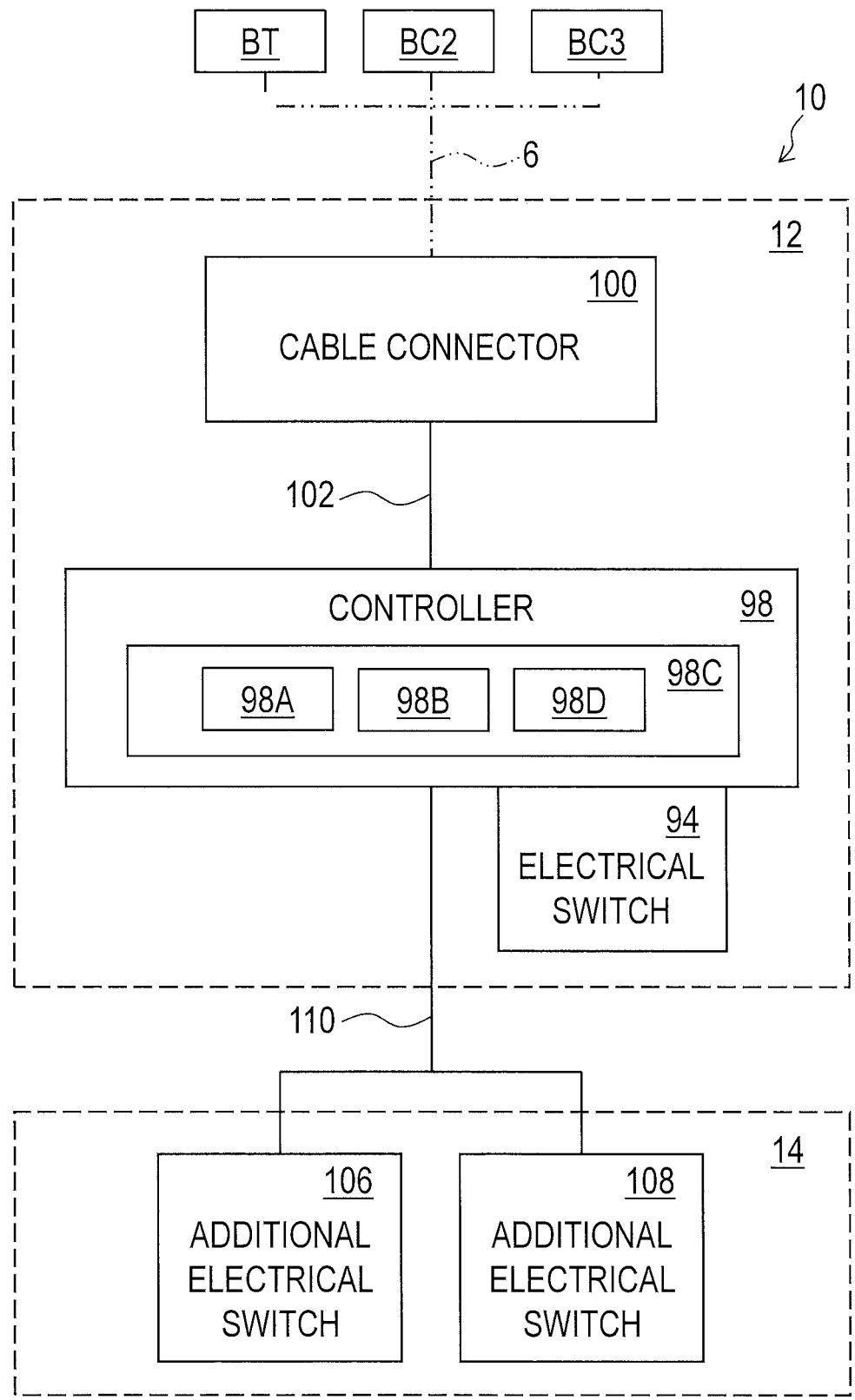
FIG. 8 is a block diagram of the bicycle operating device illustrated in FIG. 1.

As seen in FIG. 8, the bicycle operating device 10 further comprises a controller 98 electrically connected to the electrical switch 94 to generate a control signal based on an operation of the electrical switch 94. Examples of the control signal include a control signal to control the bicycle seatpost, the bicycle suspension, the bicycle shifting device, the cycle computer, and the smart phone. The controller 98 can be omitted from the bicycle operating device 10 or provided at a device other than the bicycle operating device 10.

As seen in FIG. 7, the electrical switch 94 is provided on the controller 98. The controller 98 is attached to the second end portion 18 (e.g., the pommel portion 21). The controller 98 is provided in the recess 18A of the second end portion 18 of the base member 12. As seen in FIG. 4, the electrical switch 94 is farther from the first end portion 16 than the controller 98.

As seen in FIG. 8, the controller 98 includes a processor 98A, a memory 98B, and a substrate 98C. The processor 98A and the memory 98B are electrically mounted on the substrate 98C. The processor 98A is electrically connected to the memory 98B via the substrate 98C. The processor 98A includes a central processing unit (CPU). The memory 98B stores programs and other information. The memory 98B includes a read only memory (ROM) and a random access memory (RAM). For example, a program stored in the memory 98B is read into the processor 98A, and thereby several functions of the controller 98 are performed. The electrical switch 94 is electrically mounted on the substrate 98C. The electrical switch 94 is electrically connected to the processor 98A via the substrate 98C. As seen in FIG. 7, the substrate 98C is secured to the second end portion 18 (e.g., the pommel portion 21).

The bicycle operating device 10 further comprises a cable connector 100 provided at one of the base member 12 and the operating member 14. In this embodiment, the cable connector 100 is provided at the base member 12. However, the cable connector 100 can be provided at the operating member 14. The cable connector 100 is electrically connected to the controller 98 via a control cable 102. The cable connector 100 includes a connection port 104 (FIG. 2) to detachably receive the electrical control cable 6 to electrically connect the electrical control cable 6 to the controller 98. The cable connector 100 can be omitted from the bicycle operating device 10 or provided at a device other than the bicycle operating device 10.

The controller 98 is electrically connected to the electrical device BC2 and the additional device BC3 via the electrical control cable 6 using power line communication technology. Power line communication (PLC) carries data on a conductor that is also used simultaneously for electric power transmission or electric power distribution to the electrical device BC2 and the additional device BC3. The controller 98 includes a PLC controller 98D. The PLC controller 98D receives an input signal generated by the electrical switch 94. The PLC controller 98D superimposes the input signal on a power source voltage flowing in the electrical control cable 6. The power source voltage is supplied from a battery BT via the electrical control cable 6.

As seen in FIG. 1, the bicycle operating device 10 further comprises an additional electrical switch 106 provided at one of the base member 12 and the operating member 14. In this embodiment, the additional electrical switch 106 is provided at the operating member 14. The additional electrical switch 106 receives one of a user upshift input and a user downshift input. However, the additional electrical switch 106 can be omitted from the bicycle operating device 10.

The bicycle operating device 10 further comprises an additional electrical switch 108 provided at one of the base member 12 and the operating member 14. In this embodiment, the additional electrical switch 108 is provided at the operating member 14. The additional electrical switch 108 receives the other of the user upshift input and the user downshift input. However, the additional electrical switch 108 can be omitted from the bicycle operating device 10.

As seen in FIG. 8, the additional electrical switch 106 is electrically connected to the controller 98. The additional electrical switch 108 is electrically connected to the controller 98. In this embodiment, the additional electrical switches 106 and 108 are electrically connected to the controller 98 via a control cable 110. The controller 98 respectively generates an upshift control signal and a downshift control signal based on the user upshift input and the user downshift input. The controller 98 can be configured to respectively control separate devices in response to control signals generated based on the electrical switch 94, the additional electrical switch 106, and the additional electrical switch 108. The controller 98 can be configured to control one device in response to control signals generated based on at least two of the electrical switch 94, the additional electrical switch 106, and the additional electrical switch 108.

With the bicycle operating device 10, it is possible to utilize the second end portion 18 as a position at which the electrical switch 94 is provided. Accordingly, it is possible to improve design freedom of the bicycle operating device 10.

Second Embodiment

A bicycle operating device 210 in accordance with a second embodiment will be described below referring to FIGS. 9 to 11. The bicycle operating device 210 has the same structures and/or configurations as those of the bicycle operating device 10 except for a wireless communicator. Thus, elements having substantially the same function as those in the first embodiment will be numbered the same here, and will not be described and/or illustrated again in detail here for the sake of brevity.

Figure 9:
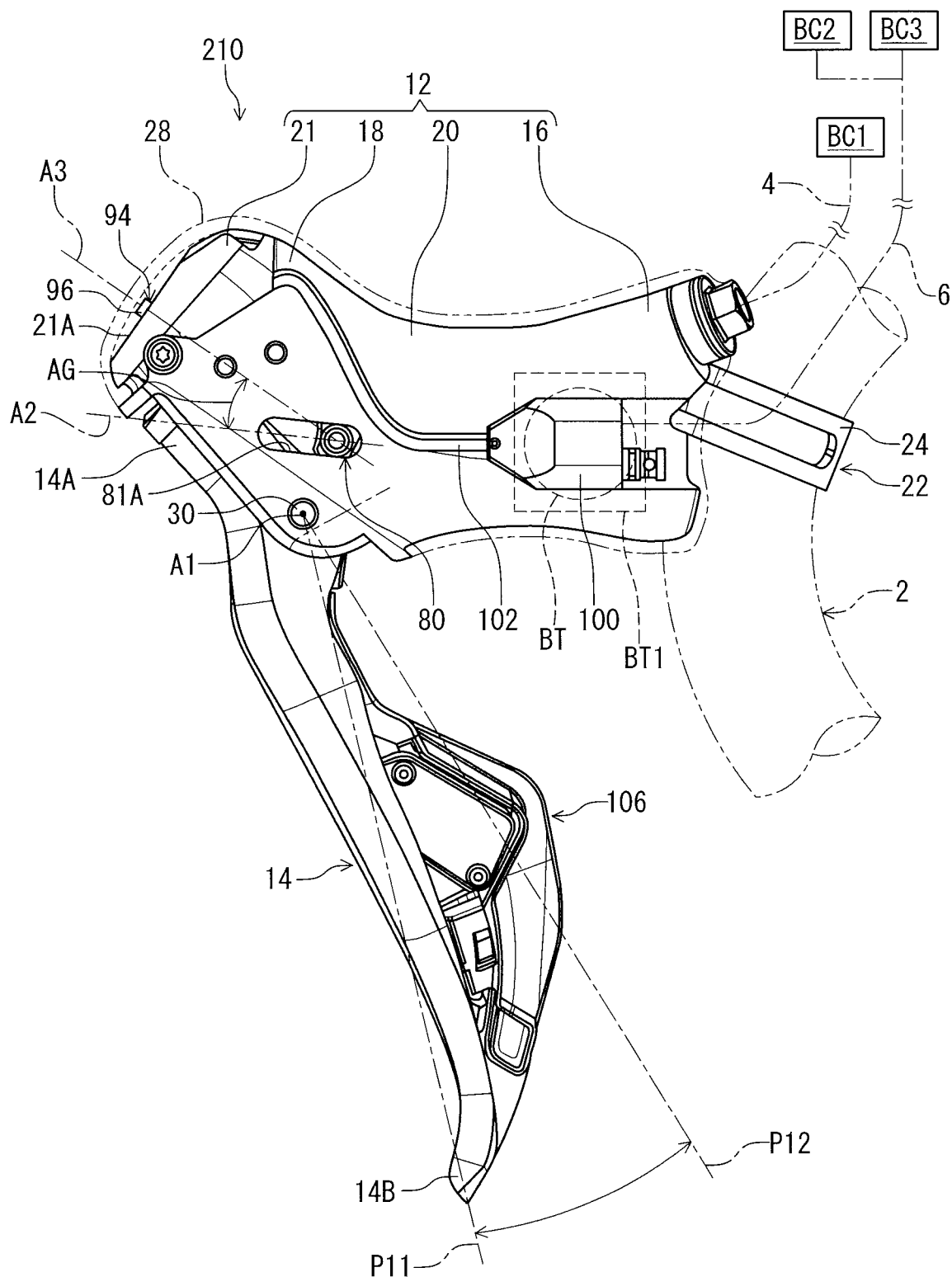
FIG. 9 is a side elevational view of a bicycle operating device in accordance with a second embodiment.
Figure 10:
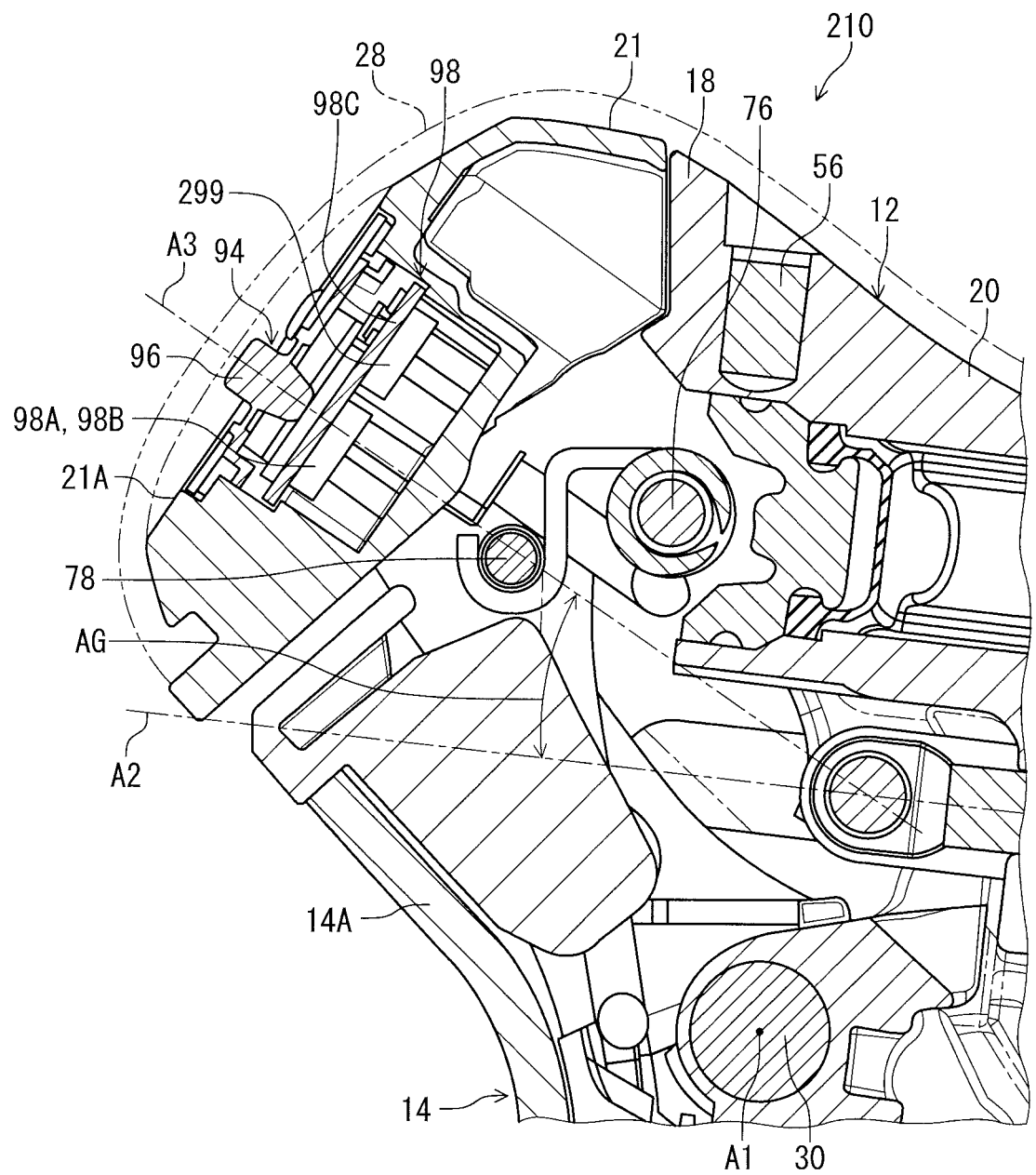
FIG. 10 is an enlarged partial cross-sectional view of the bicycle operating device illustrated in FIG. 9.
Figure 11:
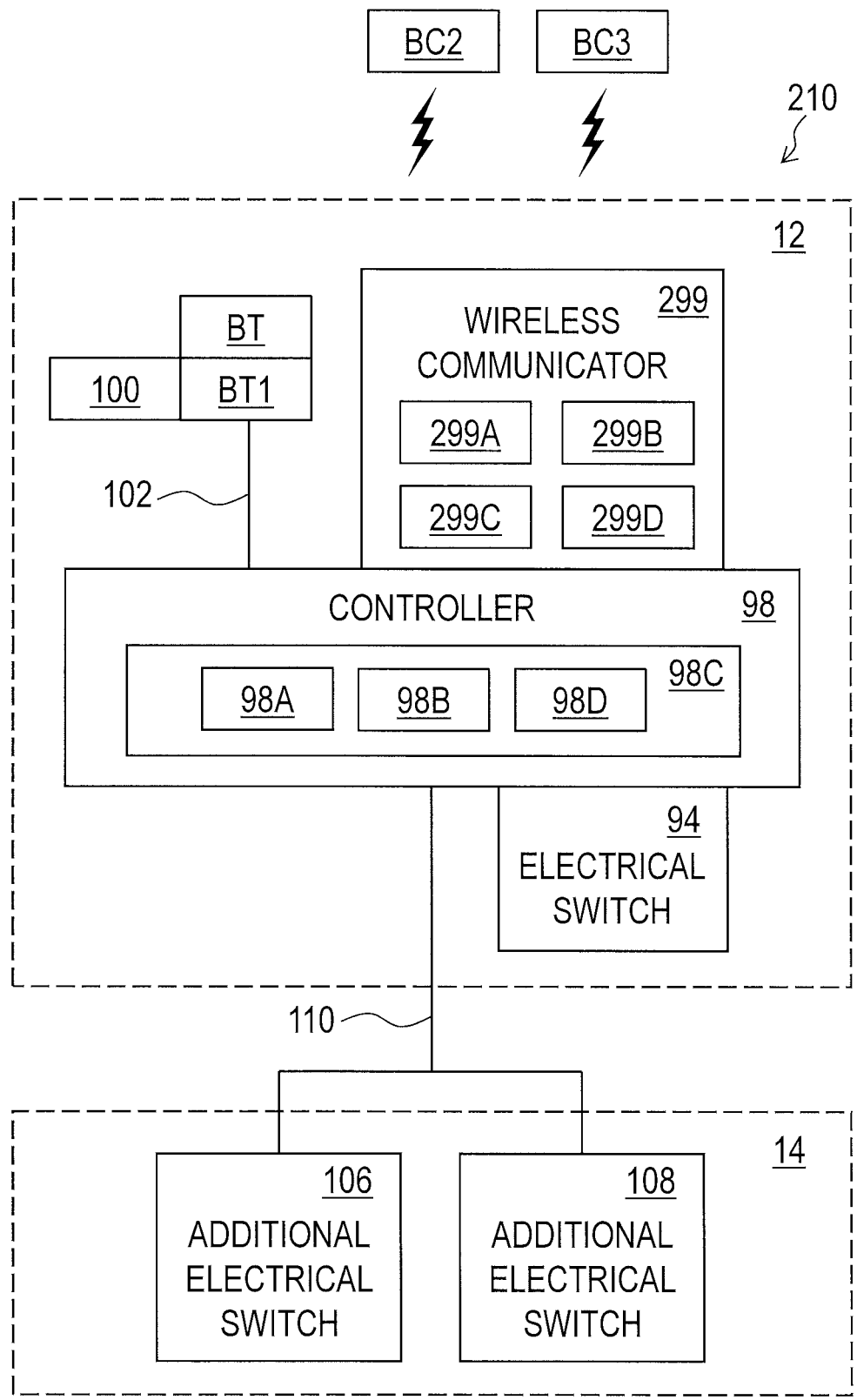
FIG. 11 is a block diagram of the bicycle operating device illustrated in FIG. 9.

As seen in FIGS. 9 to 11, the bicycle operating device 210 further comprises a wireless communicator 299 (FIG. 10) provided at one of the base member 12 and the operating member 14. In this embodiment, the wireless communicator 299 is provided at the base member 12. However, the wireless communicator 299 can be provided at the operating member 14. The wireless communicator 299 is electrically connected to the controller 98.

As seen in FIG. 11, the wireless communicator 299 includes a signal generating circuit 299A, a signal transmitting circuit 299B, an antenna 299C, and a signal receiving circuit 299D. The signal generating circuit 299A, the signal transmitting circuit 299B, the antenna 299C, and the signal receiving circuit 299D are electrically mounted on the substrate 98C of the controller 98. The signal generating circuit 299A generates wireless signals based on the control signals generated by the controller 98. The signal generating circuit 299A superimposes digital signals on carrier wave using a predetermined wireless communication protocol to generate the wireless signals. The signal transmitting circuit 299B transmits the wireless signal via the antenna 299C in response to the input operation received by the electrical switch 94. In this embodiment, the signal generating circuit 299A can encrypt control information (e.g., shift information) to generate encrypted wireless signals. The signal generating circuit 299A encrypts digital signals stored in the memory 98B using a cryptographic key. The signal transmitting circuit 299B transmits the encrypted wireless signals. Thus, the wireless communicator 299 wirelessly transmits the wireless signal to upshift or downshift the electrical device BC2 when the electrical switch 94 is closed to be activated by the input operation.

Further, the signal receiving circuit 299D receives a wireless signal from the electrical device BC2 via the antenna 299C. In this embodiment, the signal receiving circuit 299D decodes the wireless signal to recognize information wirelessly transmitted from the electrical device BC2. The signal receiving circuit 299D may decrypt the encrypted wireless signal using the cryptographic key. Namely, the wireless communicator 299 is configured to transmit a wireless signal to control other electrical components and to receive a wireless signal to recognize information from other electrical components. In other words, the wireless communicator 299 is provided as a wireless transmitter and a wireless receiver. In this embodiment, the wireless communicator 299 is integrally provided as a single module or unit. However, the wireless communicator 299 can be constituted of a wireless transmitter and a wireless receiver which are provided as separate modules or units arranged at different positions from each other. The signal receiving circuit 299D can be omitted from the wireless communicator 299.

In this embodiment, as seen in FIGS. 9 and 11, the battery BT is mounted to the base member 12 and is electrically connected to the controller 98 via the control cable 102. In this embodiment, a battery holder BT1 is mounted to the base member 12 and is electrically connected to the control cable 102 and the cable connector 100. The battery BT is attached to the battery holder BT1 and is electrically connected to the controller 98 via the battery holder BT1 and the control cable 102. The battery BT can be electrically connected to another device via the cable connector 100.

With the bicycle operating device 210, it is possible to obtain substantially the same effect as that of the bicycle operating device 10 of the first embodiment.

Third Embodiment

A bicycle operating device 310 in accordance with a third embodiment will be described below referring to FIG. 12. The bicycle operating device 310 has the same structures and/or configurations as those of the bicycle operating device 10 except that the piston 34 is pushed to generate a hydraulic pressure. Thus, elements having substantially the same function as those in the above embodiments will be numbered the same here, and will not be described and/or illustrated again in detail here for the sake of brevity.

Figure 12:
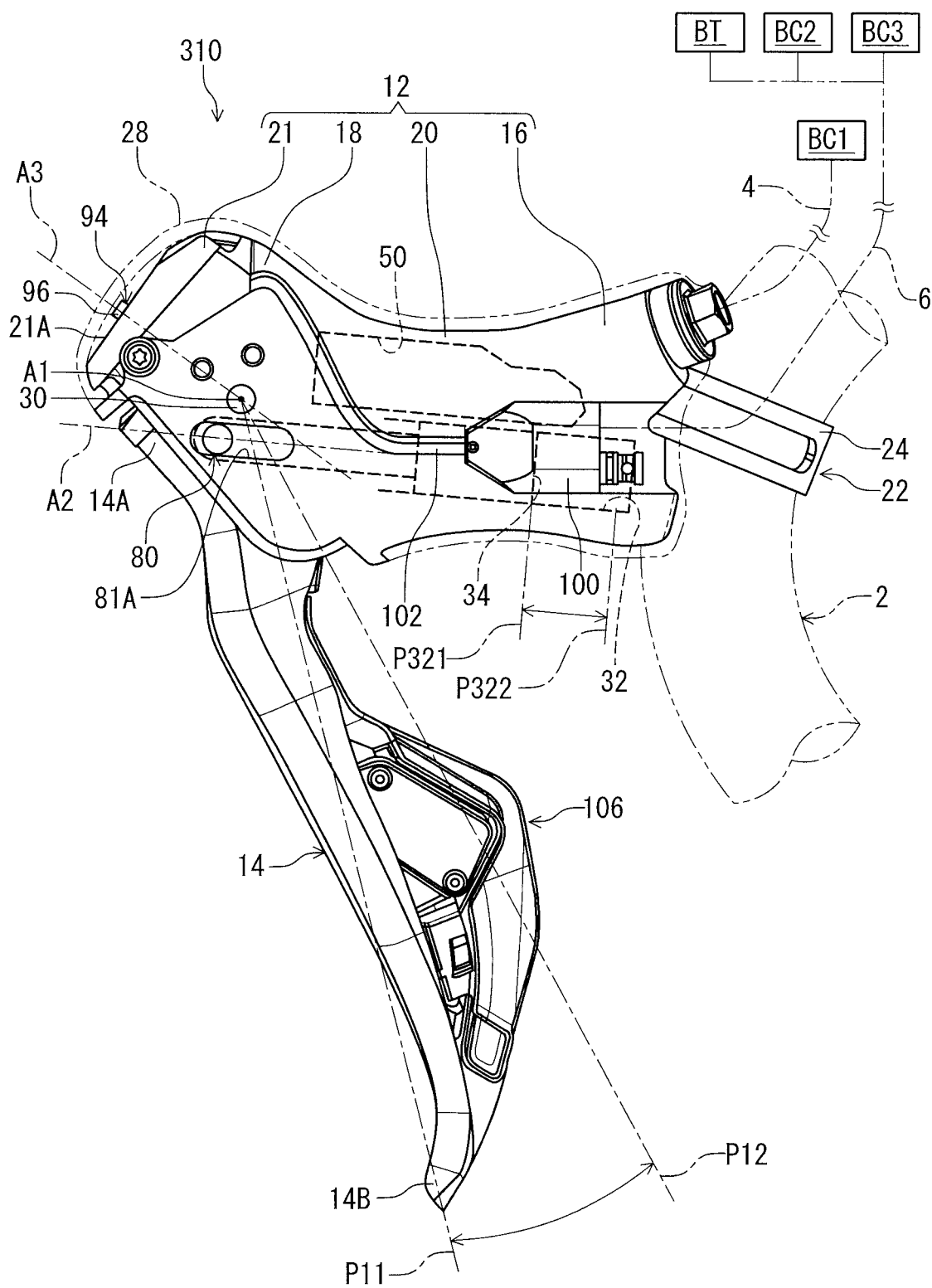
FIG. 12 is a side elevational view of a bicycle operating device in accordance with a third embodiment.

As seen in FIG. 12, in the bicycle operating device 310, the operating member 14 is operatively coupled to the piston 34 to push the piston 34 from an initial position P321 to an actuated position P322 in response to a pivotal movement of the operating member 14.

With the bicycle operating device 310, it is possible to obtain substantially the same effect as that of the bicycle operating device 10 of the first embodiment.

Fourth Embodiment

A bicycle operating device 410 in accordance with a fourth embodiment will be described below referring to FIG. 13. The bicycle operating device 410 has the same structures and/or configurations as those of the bicycle operating device 10 except for the base member 12. Thus, elements having substantially the same function as those in the above embodiments will be numbered the same here, and will not be described and/or illustrated again in detail here for the sake of brevity.

As seen in FIG. 13, the bicycle operating device 410 comprises a base member 412. The base member 412 has substantially the same structure as that of the base member 12 of the first embodiment. In this embodiment, the base member 412 is configured to be mounted to a bar end 402A of a bicycle handlebar 402. The base member 412 includes a first end portion 416 to be mounted to the bicycle handlebar 402. The base member 412 includes a second end portion 418 opposite to the first end portion 416. The electrical switch 94 is provided at the second end portion 418. The electrical switch 94 is farther from the distal end portion 14B of the operating member 14 than the pivot axis A1. The additional electrical switch 106 is provided at the base member 412. The additional electrical switch 108 is omitted from the bicycle operating device 410.

With the bicycle operating device 410, it is possible to obtain substantially the same effect as that of the bicycle operating device 10 of the first embodiment.

It will be apparent to those skilled in the bicycle field from the present disclosure that the constructions of the above embodiments including modifications can be at least partly combined with each other if needed and/or desired.

For example, the wireless communicator 299 of the second embodiment can be applied to the bicycle operating devices 310 and 410 of the third and fourth embodiments.

A push-type hydraulic unit described in the third embodiment can be applied to the bicycle operating devices 210 and 410 of the second and fourth embodiments.

Furthermore, the structures of the bicycle operating devices 10, 210, and 310 of the first to third embodiments can be applied to the bicycle operating device 410 of the fourth embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
    a base member including
        a first end portion to be mounted to a bicycle handlebar,
        a second end portion opposite to the first end portion,
        a cylinder bore, and
        a reservoir bore connected to the cylinder bore, the reservoir bore is provided at a periphery of the cylinder bore;
    an operating member including
        a proximal end portion pivotally coupled to the base member about a pivot axis, and
        a distal end portion farther from the proximal end portion than the pivot axis;
    a piston movably provided in the cylinder bore and operatively coupled to the operating member to move in the cylinder bore in response to a pivotal movement of the operating member;
    an electrical switch provided at the second end portion, the electrical switch being farther from the distal end portion of the operating member than the pivot axis; and
    a controller electrically connected to the electrical switch to generate a control signal based on an operation of the electrical switch, wherein
        the cylinder bore is arranged between the pivot axis and the first end portion.

2. The bicycle operating device according to claim 1, wherein
    the electrical switch is farther from the first end portion than the pivot axis.

3. The bicycle operating device according to claim 1, wherein
    the base member includes a grip portion provided between the first end portion and the second end portion.

4. The bicycle operating device according to claim 1, wherein
    the electrical switch is farther from the first end portion than the cylinder bore.

5. The bicycle operating device according to claim 1, wherein
    the electrical switch is farther from the first end portion than the reservoir bore.

6. The bicycle operating device according to claim 5, wherein
    the reservoir bore is provided above the cylinder bore in a mounting state where the base member is mounted to the bicycle handlebar.

7. The bicycle operating device according to claim 5, wherein
    the base member includes a bleeding port connected to the reservoir bore.

8. The bicycle operating device according to claim 1, wherein
    the base member includes a pommel portion provided at the second end portion, and
    the electrical switch is provided at the pommel portion.

9. The bicycle operating device according to claim 8, wherein
    the first end portion defines a first end surface configured to be in contact with the bicycle handlebar,
    the pommel portion defines a second end surface farthest from the first end surface, and
    the electrical switch includes a user operating portion arranged in the second end surface.

10. The bicycle operating device according to claim 1, wherein
    the electrical switch is provided on the controller.

11. The bicycle operating device according to claim 1, wherein
    the electrical switch is farther from the first end portion than the controller.

12. The bicycle operating device according to claim 1, further comprising
    an additional electrical switch provided at one of the base member and the operating member, the additional electrical switch being electrically connected to the controller.

13. The bicycle operating device according to claim 12, wherein
    the additional electrical switch is provided at the operating member.

14. The bicycle operating device according to claim 1, further comprising
    a cable connector provided at one of the base member and the operating member, the cable connector being electrically connected to the controller.

15. The bicycle operating device according to claim 14, wherein
the cable connector is provided at the base member.
16. The bicycle operating device according to claim 1, further comprising
a wireless communicator provided at one of the base member and the operating member, the wireless communicator being electrically connected to the controller.
17. The bicycle operating device according to claim 1, wherein
the cylinder bore has a cylinder center axis, and
the electrical switch includes a user operating portion movable relative to the base member along an operating axis defined not to coincide with the cylinder center axis.
18. The bicycle operating device according to claim 17, wherein
an inclination angle defined between the operating axis and the cylinder center axis is equal to or smaller than 45 degrees as viewed along the pivot axis.
19. The bicycle operating device according to claim 1, wherein
the operating member is operatively coupled to the piston to pull the piston from an initial position to an actuated position in response to a pivotal movement of the operating member.
20. The bicycle operating device according to claim 1, wherein
the operating member is operatively coupled to the piston to push the piston from an initial position to an actuated position in response to a pivotal movement of the operating member.
21. The bicycle operating device according to claim 1, further comprising
a grip cover attached to the base member to at least partly cover the base member, wherein
the electrical switch is covered by the grip cover to be operated via the grip cover.
22. A bicycle operating device comprising:
a base member including
a first end portion to be mounted to a bicycle handlebar,
a second end portion opposite to the first end portion,
a cylinder bore, and
a reservoir bore connected to the cylinder bore, the reservoir bore is provided at a periphery of the cylinder bore;
an operating member pivotally coupled to the base member about a pivot axis;
a piston movably provided in the cylinder bore and operatively coupled to the operating member to move in the cylinder bore in response to a pivotal movement of the operating member;
an electrical switch directly provided on the base member at the second end portion; and
a controller electrically connected to the electrical switch to generate a control signal based on an operation of the electrical switch, wherein
the cylinder bore is arranged between the pivot axis and the first end portion.
23. A bicycle operating device comprising:
a base member including
a first end portion to be mounted to a bicycle handlebar,
a second end portion opposite to the first end portion, and
a cylinder bore;
an operating member including
a proximal end portion pivotally coupled to the base member about a pivot axis, and
a distal end portion farther from the proximal end portion than the pivot axis;
a piston movably provided in the cylinder bore and operatively coupled to the operating member to move in the cylinder bore in response to a pivotal movement of the operating member; and
an electrical switch provided at the second end portion, the electrical switch being farther from the distal end portion of the operating member than the pivot axis, wherein
the base member includes a pommel portion provided at the second end portion, and
the electrical switch is provided at the pommel portion, and
the electrical switch includes a user operating portion forwardly and upwardly facing in a mounting state where the base member is mounted to the bicycle handlebar.
24. A bicycle operating device comprising:
a base member including
a first end portion to be mounted to a bicycle handlebar,
a second end portion opposite to the first end portion, and
a cylinder bore;
an operating member including
a proximal end portion pivotally coupled to the base member about a pivot axis, and
a distal end portion farther from the proximal end portion than the pivot axis;
a piston movably provided in the cylinder bore and operatively coupled to the operating member to move in the cylinder bore in response to a pivotal movement of the operating member; and
an electrical switch provided at the second end portion, the electrical switch being farther from the distal end portion of the operating member than the pivot axis, wherein
the cylinder bore has a cylinder center axis,
the electrical switch includes a user operating portion movable relative to the base member along an operating axis defined not to coincide with the cylinder center axis, and
the operating axis is inclined relative to the cylinder center axis as viewed along the pivot axis.
25. A bicycle operating device comprising:
a base member including
a first end portion to be mounted to a bicycle handlebar,
a second end portion opposite to the first end portion, and
a cylinder bore;
an operating member including
a proximal end portion pivotally coupled to the base member about a pivot axis, and
a distal end portion farther from the proximal end portion than the pivot axis;
a piston movably provided in the cylinder bore and operatively coupled to the operating member to move in the cylinder bore in response to a pivotal movement of the operating member; and
an electrical switch provided at the second end portion, the electrical switch being farther from the distal end portion of the operating member than the pivot axis, wherein
the cylinder bore has a cylinder center axis, the electrical switch includes a user operating portion movable relative to the base member along an operating axis defined not to coincide with the cylinder center axis, and the operating axis is offset from the cylinder center axis as viewed in a direction perpendicular to the pivot axis.

26. A bicycle operating device comprising:

a base member including
- a first end portion to be mounted to a bicycle handlebar,
- a second end portion opposite to the first end portion,
- a cylinder bore, and
- a reservoir bore connected to the cylinder bore, the reservoir bore is provided at a periphery of the cylinder bore;

an operating member including
- a proximal end portion pivotally coupled to the base member about a pivot axis, and
- a distal end portion farther from the proximal end portion than the pivot axis;

a piston movably provided in the cylinder bore and operatively coupled to the operating member to move in the cylinder bore in response to a pivotal movement of the operating member;

an electrical switch provided at the second end portion, the electrical switch being farther from the distal end portion of the operating member than the pivot axis; and a controller electrically connected to the electrical switch to generate a control signal based on an operation of the electrical switch, wherein the pivot axis is farther from the first end portion than the cylinder bore.

* * * * *